US011410568B2

(12) United States Patent
Sharma et al.

(10) Patent No.: US 11,410,568 B2
(45) Date of Patent: Aug. 9, 2022

(54) DYNAMIC EVALUATION OF EVENT PARTICIPANTS USING A SMART CONTEXT-BASED QUIZ SYSTEM

(71) Applicant: Dell Products L.P., Round Rock, TX (US)

(72) Inventors: Rohan Sharma, Delhi (IN); Shubham Gupta, Jaipur (IN); Gyanendra Kumar Patro, Berhampur (IN)

(73) Assignee: Dell Products L.P., Round Rock, TX (US)

( * ) Notice: Subject to any disclaimer, the term of this patent is extended or adjusted under 35 U.S.C. 154(b) by 755 days.

(21) Appl. No.: 16/263,501

(22) Filed: Jan. 31, 2019

(65) Prior Publication Data

US 2020/0251006 A1    Aug. 6, 2020

(51) Int. Cl.
| | | |
|---|---|---|
| G09B 7/02 | (2006.01) | |
| G06N 20/00 | (2019.01) | |
| G09B 5/12 | (2006.01) | |
| G06V 20/10 | (2022.01) | |

(52) U.S. Cl.
CPC ............. *G09B 7/02* (2013.01); *G06N 20/00* (2019.01); *G06V 20/10* (2022.01); *G09B 5/12* (2013.01)

(58) Field of Classification Search
CPC . G09B 7/02; G09B 5/12; G06N 20/00; G06V 20/10
USPC ........................................................ 434/362
See application file for complete search history.

(56) References Cited

U.S. PATENT DOCUMENTS

| | | | |
|---|---|---|---|
| 8,682,241 B2 * | 3/2014 | Huerta ..................... | G09B 7/00 434/362 |
| 8,935,277 B2 | 1/2015 | Kuchmann-Beauger et al. | |
| 8,983,962 B2 | 3/2015 | Nakazawa et al. | |
| 9,117,374 B2 * | 8/2015 | Nguyen ..................... | G09B 7/00 |
| 9,536,439 B1 * | 1/2017 | Goldstein ................ | G09B 7/00 |
| 9,536,440 B2 * | 1/2017 | Mayumi ................... | G09B 7/04 |

(Continued)

OTHER PUBLICATIONS

Xiao et al., Dual Ask-Answer Network for Machine Reading Comprehension, https://arxiv.org/pdf/1809.01997.pdf, Sep. 10, 2018.

*Primary Examiner* — Robert P Bullington
(74) *Attorney, Agent, or Firm* — Ryan, Mason & Lewis, LLP

(57) ABSTRACT

Methods, apparatus, and processor-readable storage media for generating context-based question-answer pairs by applying artificial intelligence techniques to context-related data are provided herein. An example computer-implemented method includes obtaining multi-modal data pertaining to a given event, and removing noise from the multi-modal data by applying filtering techniques to the multi-modal data, thereby generating filtered multi-modal data; creating a comprehensive set of multi-modal data pertaining to at least a portion of the given event by aggregating the filtered multi-modal data in accordance with topic modelling techniques and removing any items of duplicate filtered multi-modal data; dynamically generating question-answer pairs related to the given event by applying machine reading comprehension-based artificial intelligence models to the comprehensive set of multi-modal data; and outputting at least a portion of the questions from the question-answer pairs to one or more participants of the given event.

20 Claims, 10 Drawing Sheets

(56) References Cited

U.S. PATENT DOCUMENTS

| | | |
|---|---|---|
| 9,916,538 B2 | 3/2018 | Zadeh et al. |
| 10,102,207 B1 | 10/2018 | White-Sullivan et al. |
| 10,255,283 B1* | 4/2019 | Cheng .................. G06F 16/93 |
| 2005/0137723 A1* | 6/2005 | Liu ........................ G09B 7/00 |
| | | 700/45 |
| 2006/0147890 A1* | 7/2006 | Bradford ................ G09B 7/00 |
| | | 434/362 |
| 2011/0125734 A1* | 5/2011 | Duboue .................. G09B 7/00 |
| | | 707/723 |
| 2014/0278378 A1* | 9/2014 | Mellett .................. G09B 7/02 |
| | | 704/9 |
| 2014/0302469 A1 | 10/2014 | Chen et al. |
| 2015/0179082 A1* | 6/2015 | Byron .................... G09B 7/00 |
| | | 434/322 |
| 2015/0199400 A1* | 7/2015 | Wu ...................... G06F 40/211 |
| | | 434/353 |
| 2016/0035234 A1* | 2/2016 | Choi ...................... G09B 7/00 |
| | | 434/323 |
| 2016/0133148 A1* | 5/2016 | Hanks .................... G09B 7/06 |
| | | 434/309 |
| 2016/0283494 A1* | 9/2016 | Krishnaswamy ... G06F 16/3334 |
| 2016/0300135 A1 | 10/2016 | Moudy et al. |
| 2017/0032689 A1* | 2/2017 | Beason .................. G06F 40/30 |
| 2017/0169717 A1* | 6/2017 | Allen ...................... G09B 7/08 |
| 2017/0213469 A1* | 7/2017 | Elchik .................. G06F 40/186 |
| 2017/0243500 A1* | 8/2017 | Kompella ................ G09B 7/02 |
| 2017/0300752 A1* | 10/2017 | Biswas ................ G11B 27/031 |
| 2017/0330087 A1* | 11/2017 | Akolkar .............. G06F 40/295 |
| 2018/0121785 A1 | 5/2018 | Min et al. |
| 2018/0260472 A1* | 9/2018 | Kelsey .................. G06F 40/30 |
| 2018/0359530 A1* | 12/2018 | Marlow .................. H04M 3/563 |
| 2018/0365619 A1 | 12/2018 | Hardy et al. |
| 2019/0043379 A1* | 2/2019 | Yuan .................... G09B 7/02 |
| 2020/0388176 A1* | 12/2020 | Bramlet ................ G09B 7/04 |

\* cited by examiner

| FACTORS | WEIGHT | IDEAL SCORE | ACTUAL SCORE | ACTUAL WEIGHTED VALUE | WEIGHTED GOAL VALUE |
|---|---|---|---|---|---|
| AUDIO | 3 | 3 | 2 | 6 | 9 |
| VIDEO | 3 | 3 | 3 | 9 | 9 |
| IMAGES | 1 | 3 | 2 | 2 | 3 |
| CONTEXT BASED QUIZ | 2 | 3 | 3 | 6 | 6 |

FEEDBACK SCORE – 0.81

INSTRUCTOR QUALITY (%) – 81%

134

$$FS = \sum_{i=1}^{3}(W_i * V_i) * \sum_{j=4}^{n}(W_j * V_j)$$

$$Final\ FS = \left(\left(\frac{Actual\ FS}{Goal\ FS}\right) + (\pm N)\right)$$

304

$Actual\ FS = ((3 * 2) + (3 * 3) + (1 * 2)) * (2 * 3) = 17 * 6$ $Goal\ FS = ((3 * 3) + (3 * 3) + (1 * 3)) * (2 * 3) = 21 * 6$ $Final\ FS\ [Feedback\ Score] = ((17 * 6)/(21 * 6)) + N = (0.81) + N$ $Final\ FS\ [Feedback\ Score] = 0.81$

DYNAMIC EVALUATION OF EVENT PARTICIPANTS USING A SMART CONTEXT-BASED QUIZ SYSTEM

FIELD

The field relates generally to information processing systems, and more particularly to techniques for data processing in such systems.

BACKGROUND

Conventional event-related quiz systems typically require a significant amount of data in order to automate the quiz generation process. Additionally, creating, managing, and updating such data requires considerable labor and expense. Also, conventional approaches are commonly unable to generate quizzes based on context-related information. For example, consider a scenario wherein an instructor is teaching Topic A but has covered only 40% of the topic during the event. When asked to generate a quiz for Topic A, conventional automated quiz systems are typically incapable of selecting only those questions from a database which are relevant to the 40% of Topic A that was covered during the event. As a result, the generated quiz is likely to be inefficient or out of scope with the event in question.

SUMMARY

Illustrative embodiments of the disclosure provide techniques for generating context-based question-answer pairs by applying artificial intelligence techniques to context-related data. An exemplary computer-implemented method includes obtaining multi-modal data from one or more data sources, wherein the multi-modal data pertains to a given event, and removing one or more items of noise from the obtained multi-modal data by applying one or more filtering techniques to the multi-modal data, thereby generating filtered multi-modal data. Such a method also includes creating a comprehensive set of multi-modal data pertaining to at least a portion of the given event by aggregating the filtered multi-modal data in accordance with one or more topic modelling techniques and removing any items of duplicate filtered multi-modal data, and dynamically generating one or more question-answer pairs related to the given event by applying one or more machine reading comprehension-based artificial intelligence models to the comprehensive set of multi-modal data. Further, such a method includes outputting at least a portion of the one or more questions from the one or more question-answer pairs to one or more participants of the given event.

Illustrative embodiments can provide significant advantages relative to conventional automated quiz generation techniques. For example, challenges associated with insufficient and/or incomplete feedback are overcome through creation of context-related information from a given environment via topic modelling, as well as the creation of artificial intelligence-based quizzes in real-time without the need for a static pre-existing question-answer database related to the given topic.

These and other illustrative embodiments described herein include, without limitation, methods, apparatus, systems, and computer program products comprising processor-readable storage media.

BRIEF DESCRIPTION OF THE DRAWINGS

FIG. 3 shows an example evaluation calculation in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
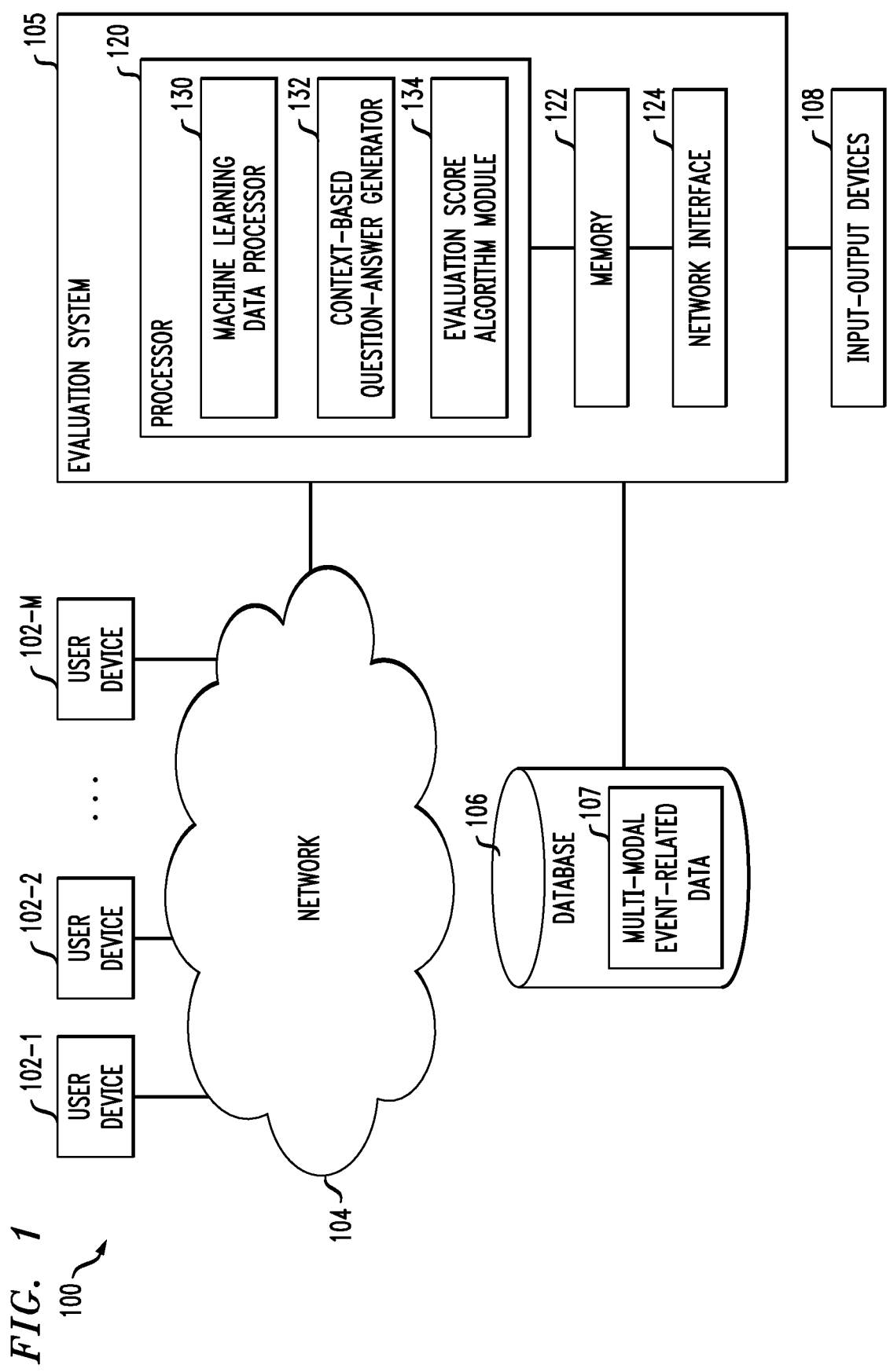
FIG. 1 shows an information processing system configured for evaluations performed by applying machine learning and artificial intelligence techniques to multi-modal data in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is evaluation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the evaluation system 105 can have an associated database 106 configured to store multi-modal event-related data 107, which may comprise, for example, audio data, video data, image data, and/or context-based quiz data associated with one or more events (such as lectures, presentations, etc.).

The database 106 in the present embodiment is implemented using one or more storage systems associated with the evaluation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the evaluation system 105 are input-output devices 108, which illustratively comprise keyboards, displays or other types of input-output devices in any combination. Such input-output devices can be used, for example, to support one or more user interfaces to the evaluation system 105, as well as to support communication between the evaluation system 105 and other related systems and devices not explicitly shown.

The evaluation system 105 in the FIG. 1 embodiment is assumed to be implemented using at least one processing device. Each such processing device generally comprises at least one processor and an associated memory, and implements one or more functional modules for controlling certain features of the evaluation system 105.

More particularly, the evaluation system 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the evaluation system 105 to communicate over the network 104 with the user devices 102, and illustratively comprises one or more conventional transceivers.

The processor 120 further comprises a machine learning data processor 130, a context-based question-answer generator 132, and an evaluation score algorithm module 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the machine learning data processor 130, context-based question-answer generator 132, and evaluation score algorithm module 134 may be implemented at least in part in the form of software that is stored in memory 122 and executed by processor 120.

It is to be understood that the particular set of elements shown in FIG. 1 for evaluations performed by applying machine learning and artificial intelligence techniques to multi-modal data involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

An exemplary process utilizing machine learning data processor 130, context-based question-answer generator 132, and evaluation score algorithm module 134 of an example evaluation system 105 in computer network 100 will be described in more detail with reference to the flow diagrams of FIG. 8 and FIG. 9.

At least one embodiment includes assessing the quality of an instructor by providing a mathematical index derived from mathematical logic which will indicate a feedback score of the instructor based on various parameters. As detailed herein, such an embodiment includes capturing data-driven feedback with respect to audio data, video data and image data. As also noted, such multi-modal data can be processed within the framework of one or more factors such as, for example, instructor confidence, instructor engagement with audience, instructor correctness, instructor pitch, instructor punctuality, instructor friendliness, content verification, completion, instructor answering of questions, etc.

Additionally, in one or more embodiments, a factor weight system is implemented wherein predefined weights (for example, 3, 2, and 1) are applied to the modes (i.e., audio, video, and image) of captured and/or processed data (whose values are calculated through one or more algorithms, as further described herein). Such weightages are determined and updated in connection with one or more machine learning models.

Accordingly, at least one embodiment includes generating instructor quality values by calculating the feedback score of the instructor. By way merely of example, a final value may be in the form of a percentage (out of 100%) value. Further, one or more embodiments can include additional features such as implementing a dynamic dashboard that leverages the generated quality values to provide insights about instructors and help instructors improve in one or more targeted areas. Such additional features can also include implementing one or more machine learning techniques of logistic regression to select an instructor for a future event based on generated quality values and various variables/parameters desired and/or required in an instructor for the given event.

As detailed herein, one or more embodiments include utilizing and processing audio data. Specifically, such embodiments include processing factors such as the tone of the instructor, the pitch of the instructor, the correctness of the instructor in answering questions and/or teaching, understanding context of audience participation, the sentiment of the instructor, etc. The processing of audio data can be carried out, for example, by audio feedback algorithms as well as machine learning compression algorithms such as Dual Ask-Answer Network (DAANET) modelling techniques for machine reading comprehension (MRC) related analysis. At least one embodiment includes obtaining an audio transcript from the audio file in question and analyzing the content of the transcript to identify various types of entities talking during the event. Such an embodiment can further include determining an understanding the context and content of what is being taught/discussed during the event, and identifying when a question is asked and answered by training one or more artificial intelligence models applied to the relevant audio files.

One or more embodiments also include generating questions and answers using the audio files captured using, for example, a two-stage synthesis network. The correctness of what is being taught or discussed can then be checked, as well as whether the questions were answered properly by the instructor using a DAANet model for MRC.

As also detailed herein, one or more embodiments include utilizing and processing video data. Specifically, such embodiments include processing factors such as the sentiment of the instructor, the sentiment of the audience, and the confidence of the audience. The processing of video data can be carried out, for example, by video feedback algorithms including one or more dynamic and/or recognition algorithms, which can be utilized to calculate values for one or more factors of the video data (such as noted above).

As further detailed herein, one or more embodiments include utilizing and processing image data. Specifically, such embodiments include processing factors such as the confidence of the instructor and/or audience at various stages of the event. The processing of video data can be carried out, for example, by image feedback algorithms including, for example, one or more convolutional neural network- (CNN-) based image classification algorithms. At least one embodiment includes capturing random-timed photos, during the event, of the audience and the instructor to create a time frame of images. Using such a created time frame of images, such an embodiment further includes calculating confidence values attributed to the instructor and the audience (using one or more recognition algorithms) at various stages of time during the event (thus creating a journey and/or experience of the instructor and the audience). Such actions can additionally be expanded for various factors other than confidence.

Much of the above-detailed multi-modal factor data analysis can include training models based on previous labeled data. Outputs can include, by way of example, percentage-based values among the audience group (e.g., 20% of the audience looks angry, etc.). Also, in one or more embodiments, additional factors can be added.

Additionally, as also detailed herein (and further described in connection with FIG. 6 and FIG. 7), one or more embodiments include generating and utilizing context-based quiz information. In accordance with such an embodiment, questions are dynamically generated and asked to audience members on the basis of context, wherein the context can be with respect to the topics and subjects taught or discussed in the event in question. The questions can be created using one or more artificial intelligence techniques such as, for example, utilizing a two-stage synthesis network to generate question and answer pairs. The questions can be generated in a variety of levels of difficulty, and different questions can be presented to different users/audience members on the basis of one or more parameters (e.g., according to job title). Based on how easily and correctly a user/audience member is able to answer the questions will help in determining his or her attentiveness and understanding of the material being taught or discussed during the event.

Also, one or more embodiments include analyzing the user's answers to help determine whether the instructor was able to portray the concept(s) properly to the audience. Further, in at least one embodiment, noise is a factor which will help in identifying how organized and/or interactive the event was.

Additionally, as noted above, one or more embodiments include implementing weights for the multi-modal data and/or factors thereof. In such an embodiment, each mode of data (i.e., audio, video, image) and/or each factor has a predefined weight based, for example, on user-defined levels of importance of the data and/or factor.

Figure 2:
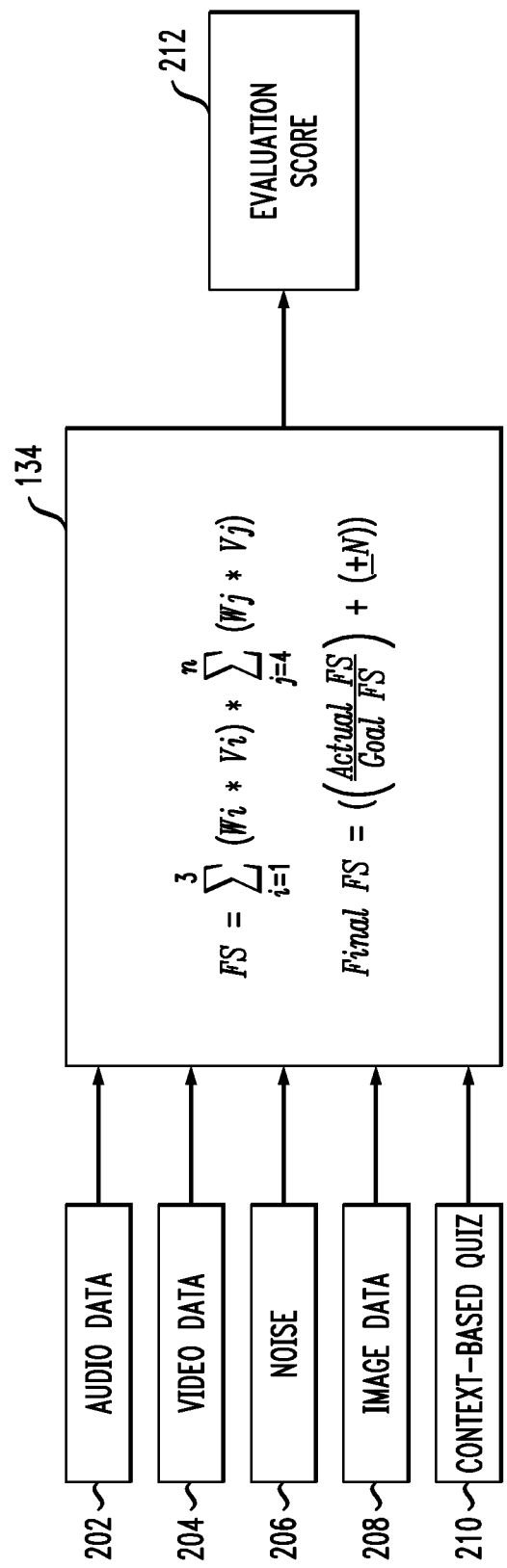
FIG. 2 shows a hybrid main algorithm implemented in an illustrative embodiment.

FIG. 2 shows a hybrid main algorithm implemented in an illustrative embodiment. By way of illustration, FIG. 2 depicts audio data 202, video data 204, noise data 206, image data 208, and context-based quiz data 210 provided as input to evaluation score algorithm module 134, which generates an evaluation score 212. As noted in the FIG. 2 embodiment, the evaluation score algorithm module 134 can include implementing the following algorithms:

$$FS = \sum_{i=1}^{3} (Wi * Vi) * \sum_{j=4}^{n} (Wj * Vj)$$

$$\text{Final } FS = \left(\left(\frac{\text{Actual } FS}{\text{Goal } FS}\right) + (\pm N)\right)$$

In the above algorithms, N defines the noise element factor in the event/session, Wi=[1, 2, 3], which represents the predefined weights for audio, video and images data factors, Vi=[1, 2, 3], which represents the determined value(s) of the audio, video and image data factors, Wj=[4, . . . , n], which represents the predefined weights for the context-based quiz data factor, Vj=[4, . . . , n], which represents the determined value(s) of the context-based quiz data factor, and "n" signifies future factors.

FIG. 3 shows an example evaluation calculation in an illustrative embodiment. By way of illustration, FIG. 3 depicts a table 302 that includes values for the weight, ideal/goal score, actual score, actual weighted value, and weighted goal value for the audio, video, image, and context-based quiz data factors. The data from table 302 is then utilized by evaluation score algorithm module 134 to generate a final feedback score 304.

Figure 4:
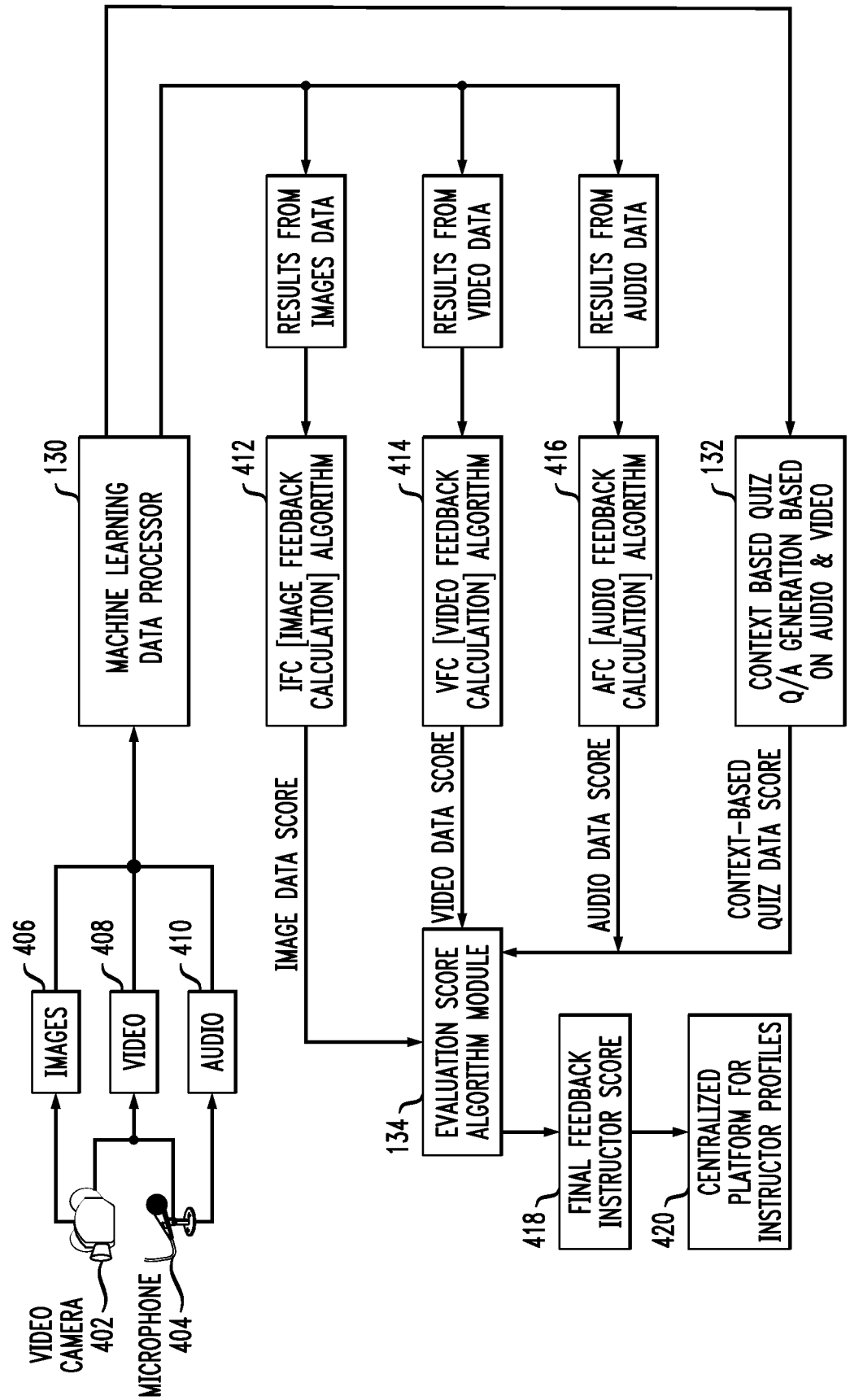
FIG. 4 shows system architecture in an illustrative embodiment.

FIG. 4 shows system architecture in an illustrative embodiment. By way of illustration, FIG. 4 depicts a video camera 402 and a microphone 404, which capture image data 406, video data 408, and audio data 410, and pass such captured data to machine learning data processor 130. The machine learning data processor 130 applies machine learning algorithms to the obtained data and provides the output image data results to an image feedback calculation (IFC) algorithm 412, provides the output video data results to a video feedback calculation (VFC) algorithm 414, and provides the output audio data results to an audio feedback calculation (AFC) algorithm 416. Additionally, the machine learning data processor 130 provides audio data results and video data results to context-based question-answer generator 132 for the generation of question-answer pairs pertaining to the event in question.

The IFC algorithm 412 provides an image data score to evaluation score algorithm module 134, the VFC algorithm 414 provides a video data score to evaluation score algorithm module 134, and the AFC algorithm 416 provides an audio data score to evaluation score algorithm module 134. Additionally, the context-based question-answer generator 132, based on analysis of participant responses against dynamically generated questions, provides a context-based quiz data score to evaluation score algorithm module 134. Based on such inputs, the evaluation score algorithm module 134 generates a final feedback instructor score 418, which is then uploaded onto a centralized platform 420 for instructor profiles. Such a platform 420, for example, can be used by an organization to select particular instructors for particular events based on the profiles contained therein.

Figure 5:
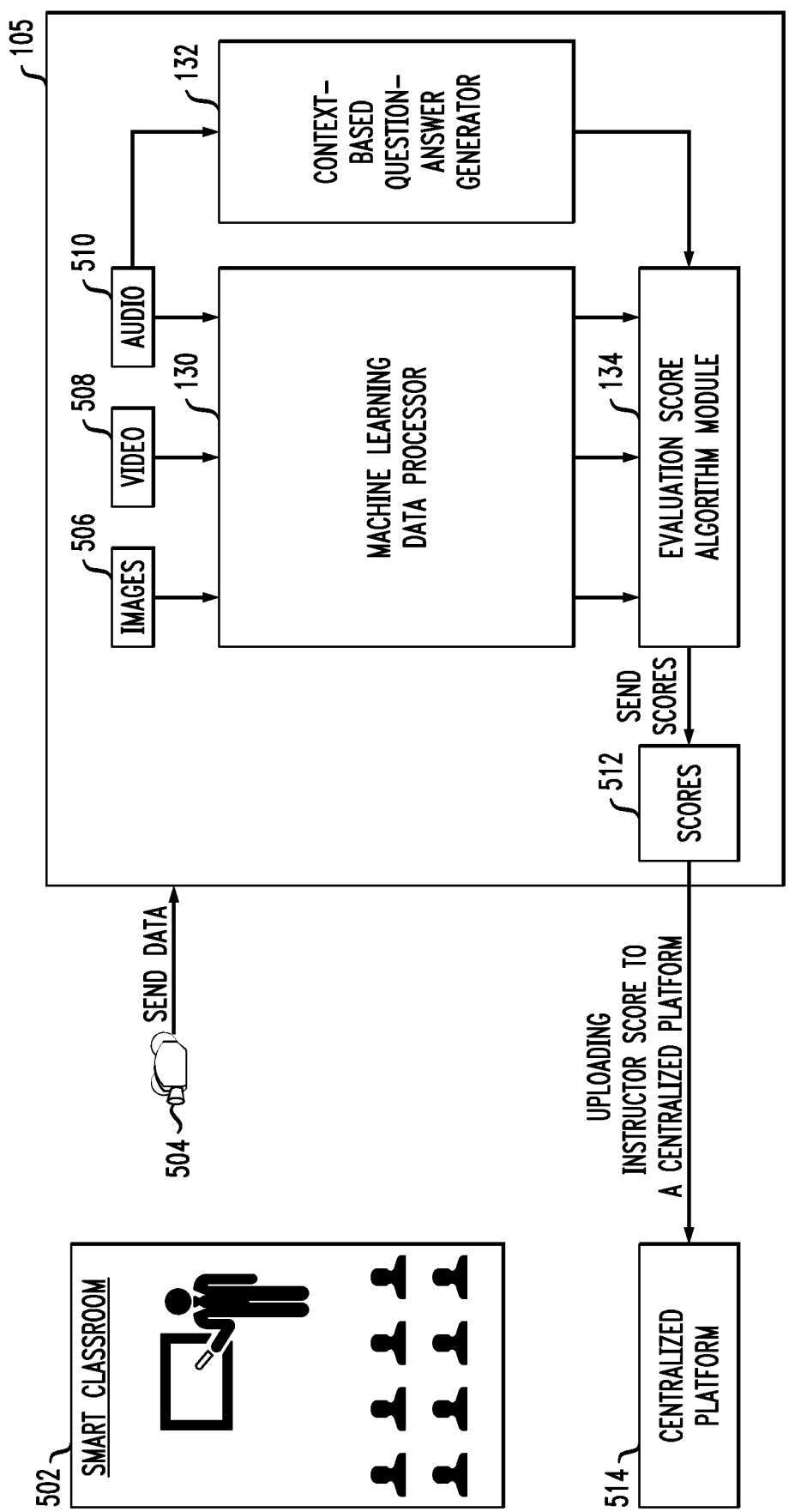
FIG. 5 shows an example system workflow in an illustrative embodiment.

FIG. 5 shows an example system workflow in an illustrative embodiment. By way of illustration, the FIG. 5 embodiment depicts a smart classroom 502 and an audio/video capturing component (such as a video camera) 504, which captures image data 506, video data 508, and audio data 510 from the smart classroom 502. The captured data is provided to evaluation system 105, wherein the machine learning data processor 130 and the context-based question-answer generator 132 process at least a portion of the data and provide inputs to the evaluation score algorithm module 134 (such as described above and herein). The evaluation score algorithm module 134 generates one or more instructor scores 512, which are then output to a centralized platform 514 (wherein such scores can be utilized in instructor profiles and used by organizations or uses in future instructor-and/or event-related decisions).

Figure 6:
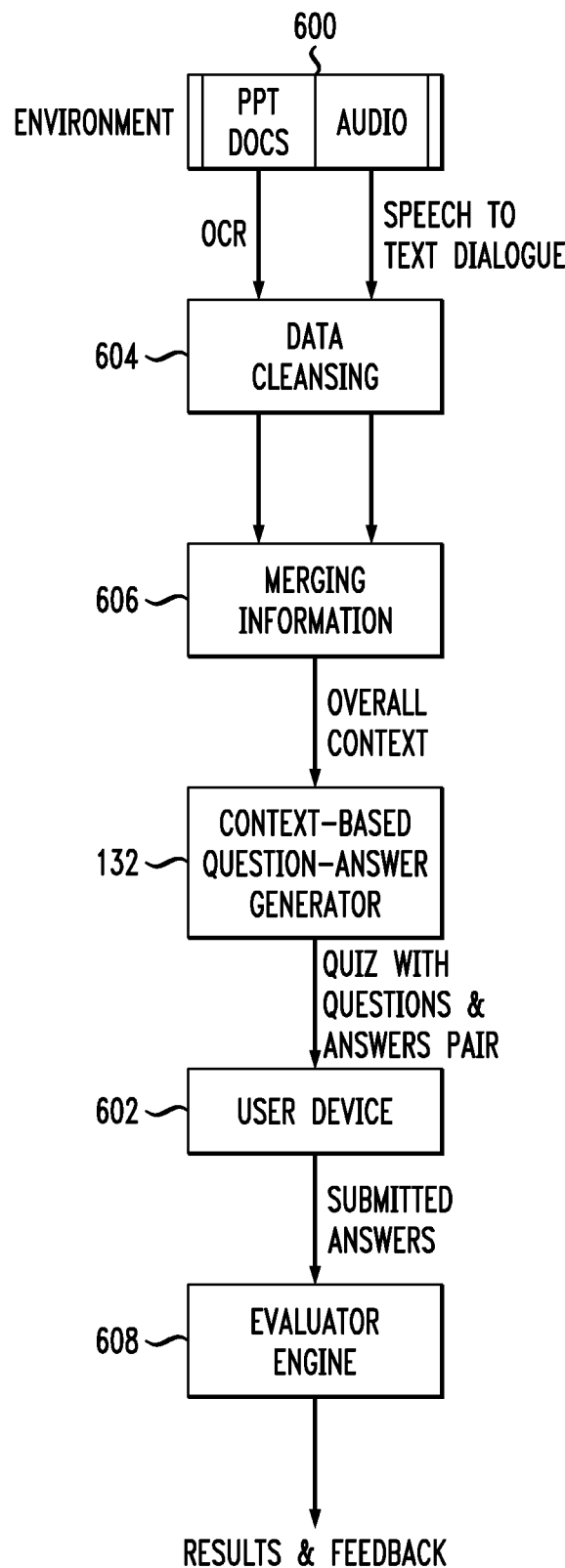
FIG. 6 shows system architecture in an illustrative embodiment.
Figure 7:
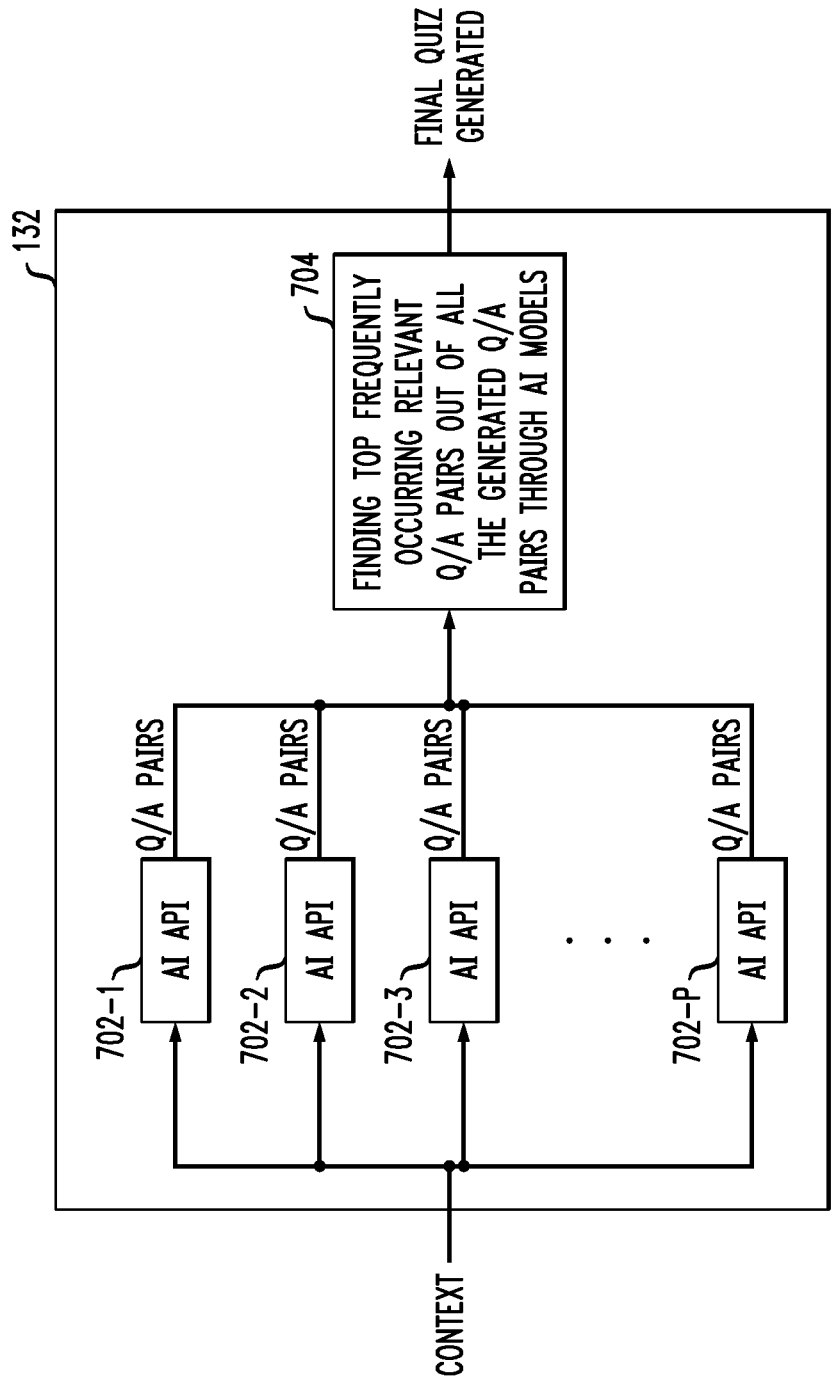
FIG. 7 shows system architecture in an illustrative embodiment.

FIG. 6 and FIG. 7 show system architecture in an illustrative embodiment. Specifically, FIG. 6 and FIG. 7 illustrate real-time evaluation of event attendees using a smart context-based quiz system. As detailed herein, one or more embodiments include autonomously leveraging generated profiles of various user devices (such as mobile devices, watches, laptops, etc.) based upon the external environment (a public venue, an outdoor venue, a user's home, a user's work location, in a meeting or event, etc.). At least one embodiment includes creating meaningful context information from a given environment by performing topic modelling and segregating the meaningful information from noise. Such an embodiment can thereby create artificial intelligence-based quizzes in real-time without the need for a static pre-existing question-answer database related to the given topic. Additionally, and as further described herein, such an embodiment is extensible to various domains based at least in part on the ability to gather and process inputs via various digital formats.

Referring to FIG. 6, environment-based context information 600 in the form of audio data, PowerPoint (PPT) data, document data, etc. can be processed (via a speech-to-text analyzer, an optical character recognition (OCR) system, etc.) and subsequently filtered by a data cleansing step (step 604). The filtered data can then be merged in step 606, and the resulting overall context information can be provided to context-based question-answer generator 132, which can use the context information to generate at least one quiz with question-answer pairs. The generated quiz is then output to a user device 602, and the user's submitted answers are processed by an evaluator engine in step 608, and results and/or feedback are ultimately generated based at least in part on the processed answers.

Referring to FIG. 7, context-based question-answer generator 132 is illustrated as including artificial intelligence (AI) application programming interfaces (APIs) 702-1, 702-2, 702-3, . . . 702-P (collectively referred to as AI APIs 702), which process obtained context information and generate one or more question-answer (Q/A) pairs. The generated Q/A pairs are then processed by module 704, which finds the top frequently occurring relevant Q/A pairs (for example, the top-x pairs) among the generated set of Q/A pairs, and generates and outputs a final quiz based thereon.

Additionally, in at least one embodiment, the context-based question-answer generator 132 is capable of receiving inputs via multiple platforms. For example, if the setting is a classroom setup, input can be received by an array of connected microphones and/or video cameras. By way of further example, if the setting is a resume checker, input can be received in the form of a digital curriculum vitae (CV). Once such input is received, the input can be sent (as shown in step 604 of FIG. 6, for example) to a data cleansing stage for removal of noise from the data. Noise can be in different types such as, for example, attendee voices or other disturbances from event-related data, extraneous personal details from a CV, etc. If data is received from multiple sources for a given use case, then the data can be sent (as shown in step 606 of FIG. 6, for example) to a data merging stage wherein the data are aggregated, and the duplicates are removed, forming a complete context. This context information is then provided to the context-based question-answer generator 132, as also depicted in FIG. 6.

At the end of the above-noted stage, an assorted list of Q/A pairs is generated, from which the context-based question-answer generator 132 can form a quiz (as depicted in FIG. 7) to be output to one or more users. Additionally, in one or more embodiments, the context-based question-answer generator 132 is capable of generating different types of questions depending upon the requirements of the user, event, and/or organizing entity. Once the user takes the quiz, the user's answers are sent to an evaluator engine (such as shown in step 608 of FIG. 6, for example), wherein the confidence of each answer is calculated. In at least one embodiment, the confidence value attributed to each answer is calculated by applying one or more similarity matching algorithms to the user-provided answer and the original suggested answer generated by the context-based question-answer generator 132. The resulting confidence values can then be used, for example, to deduce one or more insights about the user (or multiple users, if aggregating confidence values across users) and/or the instructor/candidate, depending upon the use case. For example, such calculated confidence values can be useful for checking or determining the attentiveness and comprehension of classroom attendees.

The context-based question-answer generator 132, which receives various context-related information as input, dynamically generates and outputs a set of well-defined Q/A pairs based on the context-related information. In one or more embodiments, the dynamic generation of such Q/A pairs includes implementing one or more machine reading comprehension-based artificial intelligence models. As depicted in FIG. 7, for example, the context-based question-answer generator 132 can use machine reading comprehension-based artificial intelligence models as one or more APIs to obtain results from the machine reading comprehension-based artificial intelligence models individually on the provided context information. Additionally, based upon the accuracy (determined, for example, via $F_1$ scores) of the Q/A pairs, the context-based question-answer generator 132 (via module 704 in FIG. 7, for example) ranks the Q/A pairs to identify the most commonly-occurring Q/A pairs, and uses such identified Q/A pairs as the final quiz, which can then be output to one or more users.

Figure 8:
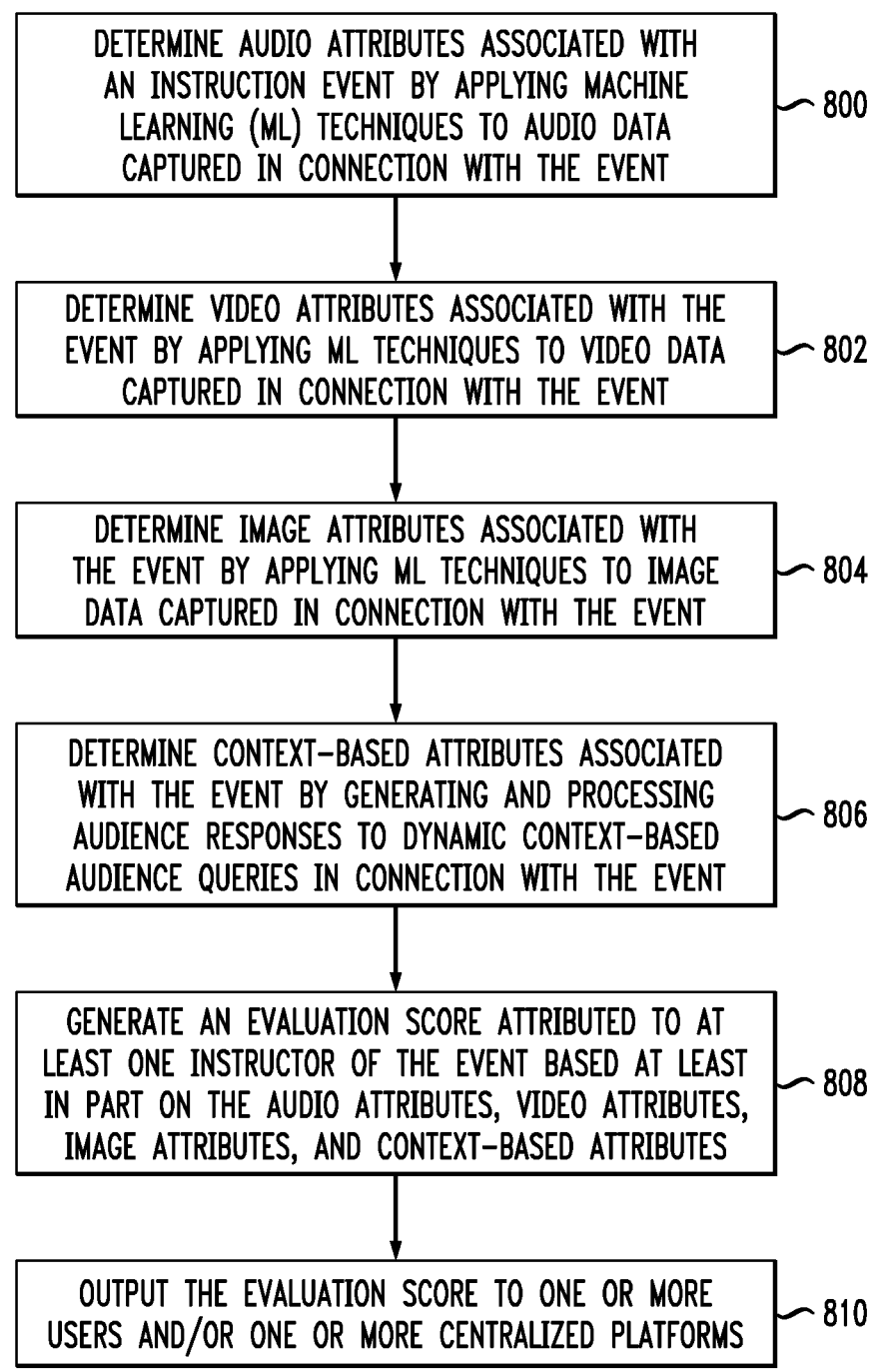
FIG. 8 is a flow diagram of a process for evaluations performed by applying machine learning and artificial intelligence techniques to multi-modal data in an illustrative embodiment.

FIG. 8 is a flow diagram of a process for evaluations performed by applying machine learning and artificial intelligence techniques to multi-modal data in an illustrative embodiment. It is to be understood that this particular process is only an example, and additional or alternative processes can be carried out in other embodiments.

In this embodiment, the process includes steps 800 through 810. These steps are assumed to be performed by the processor 120 utilizing its modules 130, 132 and 134.

Step 800 includes determining one or more audio attributes associated with an instruction event by applying one or more machine learning techniques to audio data captured in connection with the instruction event. The one or more audio attributes can include tone of the at least one instructor, pitch of the at least one instructor, sentiment of the at least one instructor, and/or correctness of the at least one instructor in answering one or more audience queries. Additionally, determining the one or more audio attributes can include training at least one model associated with the one or more machine learning techniques using labeled historical audio data.

Step 802 includes determining one or more video attributes associated with the instruction event by applying one or more machine learning techniques to video data captured in connection with the instruction event. The one or more video attributes can include sentiment of the at least one instructor and/or sentiment of the audience. Also, determining the one or more video attributes can include training at least one model associated with the one or more machine learning techniques using labeled historical video data.

Step 804 includes determining one or more image attributes associated with the instruction event by applying one or more machine learning techniques to image data captured in connection with the instruction event. The one or more image attributes can include sentiment of the at least one instructor and/or sentiment of the audience. Additionally, determining the one or more image attributes can include training at least one model associated with the one or more machine learning techniques using labeled historical image data.

Step 806 includes determining one or more context-based attributes associated with the instruction event by generating and processing audience responses to one or more dynamic context-based audience queries in connection with the instruction event, wherein the one or more dynamic context-based audience queries are generated via applying one or more artificial intelligence techniques to at least a portion of one or more of the audio data, the video data, and the image data. The one or more context-based attributes can include attentiveness of the audience and/or comprehension of instruction event content by the audience.

Step 808 includes generating an evaluation score attributed to at least one instructor of the instruction event based at least in part on the one or more audio attributes, the one or more video attributes, the one or more image attributes, and the one or more context-based attributes. Generating the evaluation score can include applying a predefined weight to each of the one or more audio attributes, the one or more video attributes, the one or more image attributes, and the one or more context-based attributes. Step 810 includes outputting the evaluation score to at least one of one or more users and one or more centralized platforms.

Figure 9:
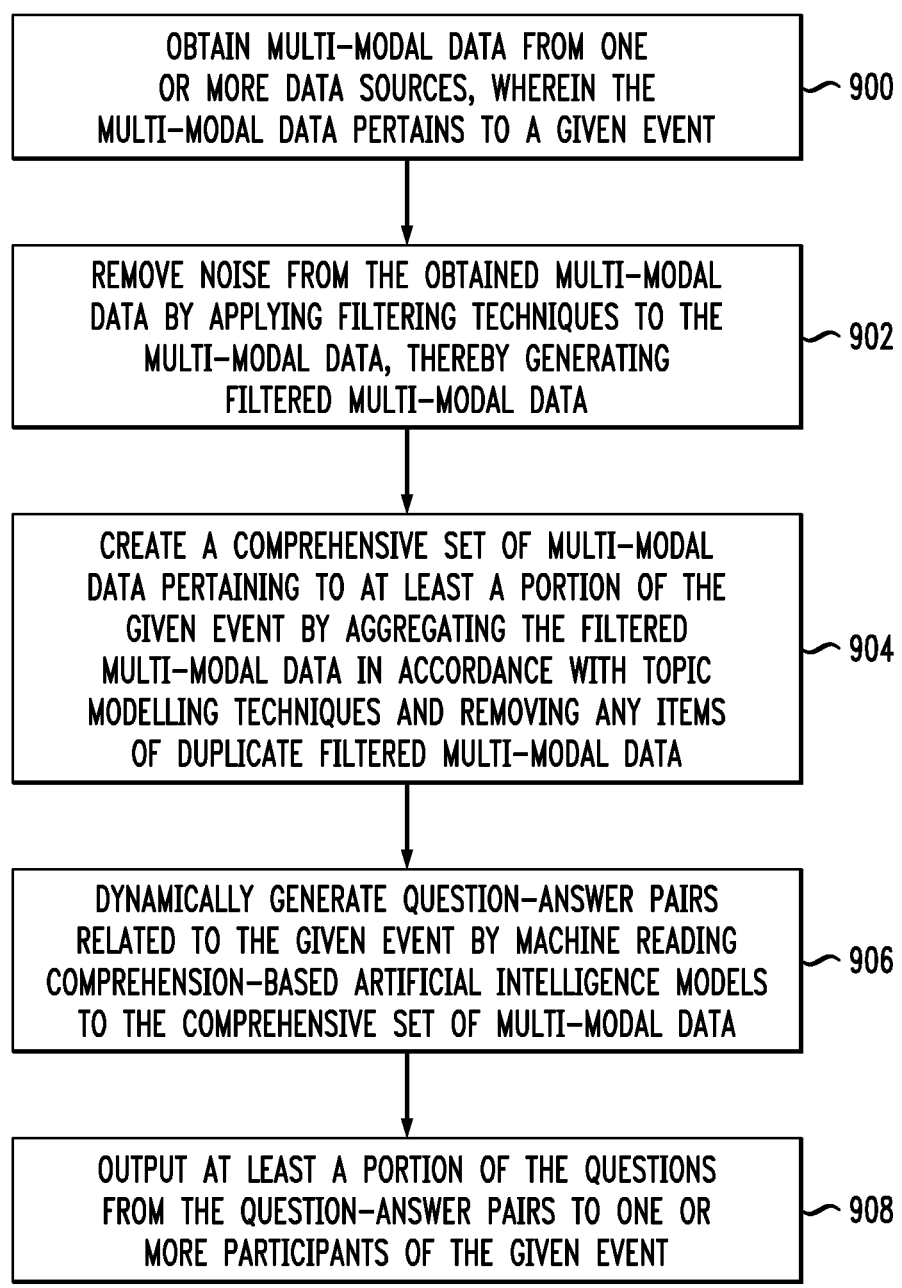
FIG. 9 is a flow diagram of a process for context-based quiz generation in an illustrative embodiment.

FIG. 9 is a flow diagram of a process for context-based quiz generation in an illustrative embodiment. It is to be understood that this particular process is only an example, and additional or alternative processes can be carried out in other embodiments.

In this embodiment, the process includes steps 900 through 908. These steps are assumed to be performed by utilizing module 132.

Step 900 includes obtaining multi-modal data from one or more data sources, wherein the multi-modal data pertains to a given event. The multi-modal data includes audio data, video data, image data, and/or text data. Step 902 includes removing one or more items of noise from the obtained multi-modal data by applying one or more filtering techniques to the multi-modal data, thereby generating filtered multi-modal data. Step 904 includes creating a comprehensive set of multi-modal data pertaining to at least a portion of the given event by aggregating the filtered multi-modal data in accordance with one or more topic modelling techniques and removing any items of duplicate filtered multi-modal data.

Step 906 includes dynamically generating one or more question-answer pairs related to the given event by applying one or more machine reading comprehension-based artificial intelligence models to the comprehensive set of multi-modal data. Dynamically generating the one or more question-answer pairs can include dynamically generating question-answer pairs of varying difficulty. Additionally, dynamically generating the one or more question-answer pairs can include utilizing context information pertaining to the one or more participants of the given event, wherein the context information includes a type of device being used by the one or more participants, etc.

Step 908 includes outputting at least a portion of the one or more questions from the one or more question-answer pairs to one or more participants of the given event. At least one embodiment also includes calculating a confidence value attributed to each answer provided by the one or more participants in response to the one or more questions. Calculating the confidence value attributed to each answer provided by the one or more participants can include applying one or more similarity matching algorithms to each answer provided by the one or more participants and the dynamically generated answers corresponding to the one or more output questions. Additionally, such an embodiment can also include determining one or more features attributed to the one or more participants of the given event based at least in part on the calculated confidence values, wherein the features include attentiveness of the one or more participants, comprehension by the one or more participants, etc.

Accordingly, the particular processing operations and other functionality described in conjunction with the flow diagrams of FIG. 8 and FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically process various forms of multi-modal data inputs throughout an event to facilitate a comprehensive analysis of the instructor and/or the event. These and other embodiments can effectively enable selection of an instructor based at least in part on outputs from machine learning techniques of logistic regression with respect to various features which need to be present for a particular event.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
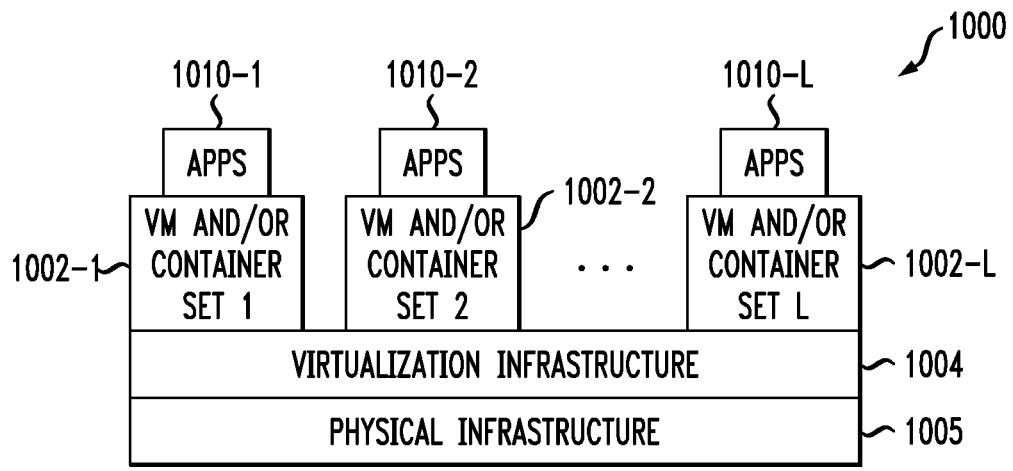
FIGS. 10 and 11 show examples of processing platforms that may be utilized to implement at least a portion of an information processing system in illustrative embodiments.
Figure 11:
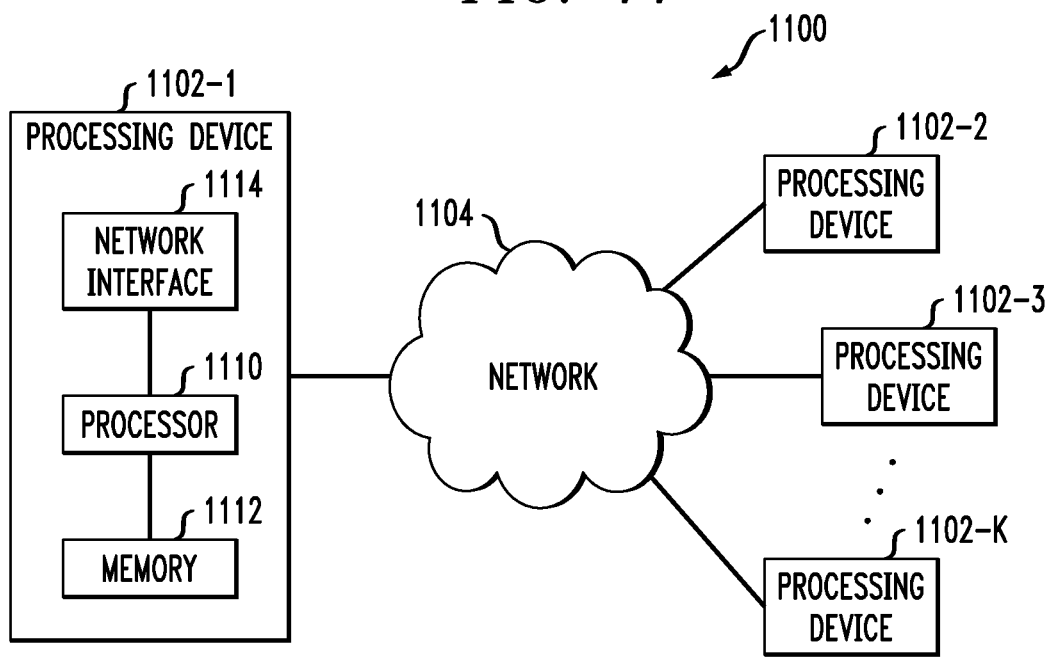

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining multi-modal data from one or more data sources, wherein the multi-modal data pertains to a given event and comprise audio data, video data, and image data;
creating a comprehensive set of multi-modal data pertaining to at least a portion of the given event by processing at least a portion of the multi-modal data in accordance with one or more topic modelling techniques, wherein processing comprises: processing at least a portion of the audio data using one or more machine learning compression algorithms, and processing at least a portion of the video data and at least a portion of the image data using one or more convolutional neural network-based image classification algorithms;
dynamically generating one or more question-answer pairs related to the given event by applying one or more machine reading comprehension-based artificial intelligence models to the comprehensive set of multi-modal data;
outputting at least a portion of the one or more questions from the one or more question-answer pairs to one or more participants of the given event; and
automatically training, based at least in part on one or more sets of labeled multi-modal data in connection with the one or more question-answer pairs, at least a portion of the one or more machine learning compression algorithms and at least a portion of the one or more convolutional neural network-based image classification algorithms;

wherein the method is performed by at least one processing device comprising a processor coupled to a memory.

2. The computer-implemented method of claim 1, wherein the multi-modal data further comprises text data.

3. The computer-implemented method of claim 1, wherein dynamically generating the one or more question-answer pairs comprises dynamically generating question-answer pairs of varying difficulty.

4. The computer-implemented method of claim 1, wherein dynamically generating the one or more question-answer pairs comprises utilizing context information pertaining to the one or more participants of the given event.

5. The computer-implemented method of claim 4, wherein the context information comprises a type of device being used by the one or more participants.

6. The computer-implemented method of claim 1, further comprising:
attributing a confidence value to each answer provided by the one or more participants in response to the one or more questions.

7. The computer-implemented method of claim 6, further comprising:
determining one or more features attributed to the one or more participants of the given event based at least in part on the confidence values.

8. The computer-implemented method of claim 7, wherein the one or more features comprise attentiveness of the one or more participants.

9. The computer-implemented method of claim 7, wherein the one or more features comprise comprehension by the one or more participants.

10. A non-transitory processor-readable storage medium having stored therein program code of one or more software programs, wherein the program code when executed by at least one processing device causes the at least one processing device:
to obtain multi-modal data from one or more data sources, wherein the multi-modal data pertains to a given event and comprise audio data, video data, and image data;
to create a comprehensive set of multi-modal data pertaining to at least a portion of the given event by processing at least a portion of the multi-modal data in accordance with one or more topic modelling techniques, wherein processing comprises: processing at least a portion of the audio data using one or more machine learning compression algorithms, and processing at least a portion of the video data and at least a portion of the image data using one or more convolutional neural network-based image classification algorithms;
to dynamically generate one or more question-answer pairs related to the given event by applying one or more machine reading comprehension-based artificial intelligence models to the comprehensive set of multi-modal data;
to output at least a portion of the one or more questions from the one or more question-answer pairs to one or more participants of the given event; and
to automatically train, based at least in part on one or more sets of labeled multi-modal data in connection with the one or more question-answer pairs, at least a portion of the one or more machine learning compression algorithms and at least a portion of the one or more convolutional neural network-based image classification algorithms.

11. The non-transitory processor-readable storage medium of claim 10, wherein dynamically generating the one or more question-answer pairs comprises dynamically generating question-answer pairs of varying difficulty.

12. The non-transitory processor-readable storage medium of claim 10, wherein dynamically generating the one or more question-answer pairs comprises utilizing context information pertaining to the one or more participants of the given event.

13. An apparatus comprising:
at least one processing device comprising a processor coupled to a memory;
the at least one processing device being configured:
to obtain multi-modal data from one or more data sources, wherein the multi-modal data pertains to a given event and comprise audio data, video data, and image data;
to create a comprehensive set of multi-modal data pertaining to at least a portion of the given event by processing at least a portion of the multi-modal data in accordance with one or more topic modelling techniques, wherein processing comprises: processing at least a portion of the audio data using one or more machine learning compression algorithms, and processing at least a portion of the video data and at least a portion of the image data using one or more convolutional neural network-based image classification algorithms;
to dynamically generate one or more question-answer pairs related to the given event by applying one or more machine reading comprehension-based artificial intelligence models to the comprehensive set of multi-modal data;
to output at least a portion of the one or more questions from the one or more question-answer pairs to one or more participants of the given event; and
to automatically train, based at least in part on one or more sets of labeled multi-modal data in connection with the one or more question-answer pairs, at least a portion of the one or more machine learning compression algorithms and at least a portion of the one or more convolutional neural network-based image classification algorithms.

14. The apparatus of claim 13, wherein dynamically generating the one or more question-answer pairs comprises dynamically generating question-answer pairs of varying difficulty.

15. The apparatus of claim 13, wherein dynamically generating the one or more question-answer pairs comprises utilizing context information pertaining to the one or more participants of the given event.

16. The apparatus of claim 13, the at least one processing device being further configured:
to attribute a confidence value to each answer provided by the one or more participants in response to the one or more questions; and
to determine one or more features attributed to the one or more participants of the given event based at least in part on the confidence values.

17. The apparatus of claim 16, wherein the one or more features comprise attentiveness of the one or more participants.

18. The apparatus of claim 16, wherein the one or more features comprise comprehension by the one or more participants.

19. The apparatus of claim 13, wherein the multi-modal data further comprises text data.

20. The non-transitory processor-readable storage medium of claim 10, wherein the multi-modal data further comprises text data.

\* \* \* \* \*